A. J. DUBEE.
SAFETY LOCK FOR AUTOMOBILE FOOTBOARDS.
APPLICATION FILED FEB. 25, 1921.

1,426,282. Patented Aug. 15, 1922.

Adelard J. Dubee,
INVENTOR

BY Victor J. Evans
ATTORNEY

WITNESS:

UNITED STATES PATENT OFFICE.

ADELARD JOSEPH DUBEE, OF GLENS FALLS, NEW YORK.

SAFETY LOCK FOR AUTOMOBILE FOOTBOARDS.

1,426,282.  Specification of Letters Patent.  Patented Aug. 15, 1922.

Application filed February 25, 1921. Serial No. 447,714.

*To all whom it may concern:*

Be it known that I, ADELARD JOSEPH DUBEE, a citizen of the United States, residing at Glens Falls, in the county of Warren and State of New York, have invented new and useful Improvements in Safety Locks for Automobile Footboards, of which the following is a specification.

This invention relates to improvements in safety locks for automobile foot boards, and the principal object is to produce a device of this nature which shall be simple of construction, cheap to manufacture, and highly efficient for the purpose for which it is designed.

Another object is to provide simple and convenient means for securing the footboard in place and which may be readily manipulated for permitting removal of the various sections of the board.

With these and other objects in view which will be more apparent as the specification proceeds, the invention resides in certain novel construction and combination and arrangement of parts, the essential features of which are hereinafter fully described, are particularly pointed out in the appended claims and are illustrated in the accompanying drawing, in which:—

Like characters of reference refer to like parts in all views.

Figure 1:
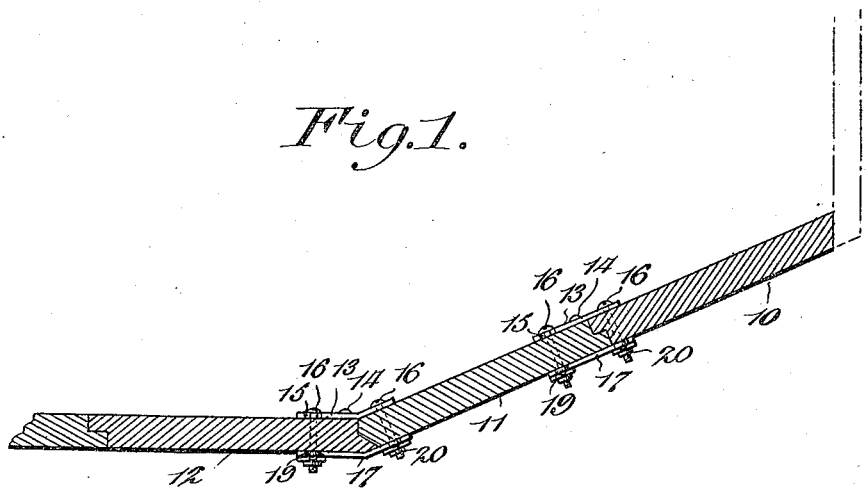
Figure 1 is a vertical sectional view of a portion of the floor of a Ford car showing the footboard held in place by my improved safety lock.
Figure 2:
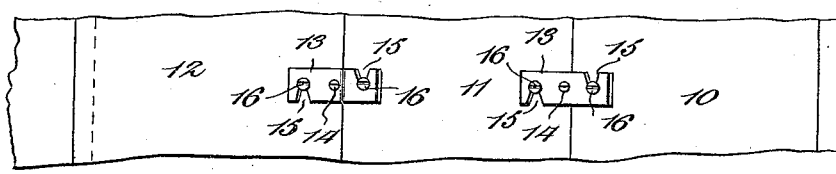
Figure 2 is a top plan view of the same.
Figure 3:
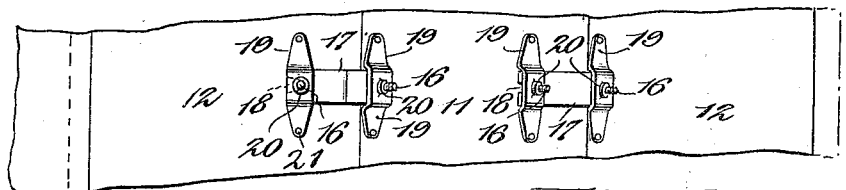
Figure 3 is a bottom view of the same.
Figures 4, 5:
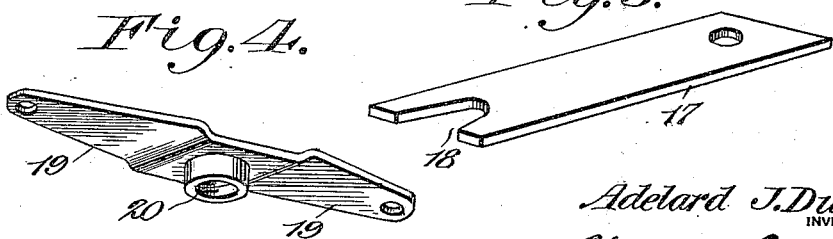
Figure 4 is a detail view of one of the nut straps.
Figure 5 is a similar view of one of the lower connecting plates.

Referring to the drawing in detail, 10, 11 and 12 represent the upper, central and lower sections of an automobile foot board, section 11 being the portion through which the pedal bars extend. The various sections are provided with co-acting rabbeted ends, and the present invention contemplates a simple and effective means for securing the sections together.

Secured to the top surfaces of sections 11 and 12 are connecting members 13 which are pivoted on screws or bolts 14. Each member is provided near its opposite ends with V-slots 15 terminating in rounded portions the centers of which are preferably in line with the center of pivot 14. Bolts 16 having heads provided with slots for manipulation by a screw driver, normally pass through the rounded portions of slots 15 and through the respective sections of the board. Lower connecting members or plates 17 are each provided with a rear opening to permit passage of the respective bolt 16, and at the forward end with a slot 18 for the passage of the forward bolt 16.

Tail nuts 20 having strap-like extensions 19 are secured across the apertures in members 17. The members 20 are secured to the board sections in any desired manner as by small screws 21.

In use, when it is desired to remove any of the sections 10, 11, 12, the bolts 16 are loosened by a screw driver and then the members 13 are rotated on their pivots 14 until they are free from the heads of the bolts. The various sections may then be readily removed, the nuts 20 being held by reason of wings 19 being secured to the board.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a device of the class described, the combination with the removable sections of a foot board, of a plurality of retaining members each having one end fixedly secured to the lower side of one of said sections, a plurality of retaining members pivotally secured to the top surfaces of said sections, and bolts passing through said retaining members for securing said sections in place.

2. In a device of the class described, the combination with the removable sections of a footboard, of a plurality of retaining members each having one end fixedly secured to the lower side of one of said sections, a plurality of retaining members pivotally secured to the top surfaces of said sections, bolts passing through said retaining members for securing said sections in place, nuts for said bolts, and nut retainers secured to said sections for maintaining said nuts in proper position and for preventing turning thereof during operation of said bolts.

3. In a device of the class described, the combination with the removable sections of an automobile footboard, of a plurality of retaining members each having one end fixedly secured to the lower surfaces of one of said sections and each formed with a hole near one end, and a slot in the opposite end, a plurality of retaining members pivotally secured to the upper surfaces of said sections and having oppositely opening slots at opposite ends, adapted to be brought into registry with the aforesaid holes and slots in the lower retaining members, and bolts adapted to pass through registering holes and slots for securing said sections in place.

4. In a device of the class described, the combination with the removable sections of an automobile footboard, of a plurality of retaining members each having one end fixedly secured to the lower surfaces of one of said sections and each formed with a hole near one end and a slot in the opposite end, a plurality of retaining members pivotally secured to the upper surfaces of said sections and having oppositely opening slots at opposite ends adapted to be brought into registry with the aforesaid holes and slots in the lower retaining members, bolts adapted to pass through registering holes and slots for securing said sections in place, and nuts for said bolts having means for securing them against loss.

In testimony whereof I have affixed my signature.

ADELARD JOSEPH DUBEE.